Feb. 18, 1947.                F. W. WELLS                2,415,924
                        LAWN MOWER WHEEL BEARING
                         Filed March 1, 1945
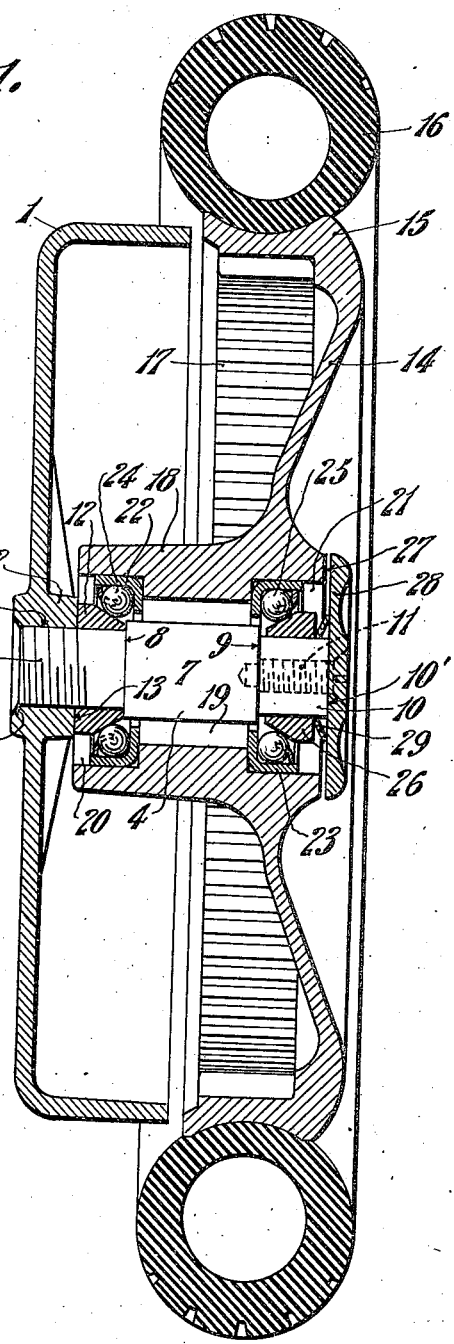
INVENTOR,
F. Warren Wells,
BY
ATTORNEY.

Patented Feb. 18, 1947

2,415,924

UNITED STATES PATENT OFFICE 2,415,924

LAWN MOWER WHEEL BEARING

Fred Warren Wells, Springfield, Mass., assignor to Blair Manufacturing Company, Springfield, Mass., a corporation of Massachusetts Application March 1, 1945, Serial No. 580,332

1 Claim. (Cl. 308—191)

This invention relates to improvements in lawn mower wheels, and is particularly directed to improvements in the bearings for lawn mower wheels.

An object of this invention is the provision, in a lawn mower wheel, of a durable, free-running, economical bearing, simple and rugged of construction, and easy to assemble and disassemble.

A further object of this invention is the provision of a lawn mower wheel bearing which, although adaptable for use with any type of lawn mower wheel, is primarily intended for use with wheels of light weight metals or plastics, which may be of softer materials than the cast iron or steel commonly in use.

A still further object of this invention is the provision of a lawn mower wheel bearing with automatic means for take-up of wear, so that the wheel will run true for the life of the wheel. In many types of lawn mower wheels, when wear occurs, a "wobble" in the wheel develops and the wheel rubs against the side frame, resulting in increased resistance to operation and excessive wear on the side frame and tire or rim of the wheel. It is an object of this invention to eliminate these undesirable characteristics of the construction now widely in use.

These, and other objects and advantages of this invention will be clearly described and disclosed in this specification, the accompanying drawing, and the appended claim.

Broadly, this invention comprises, in combination with a lawn mower side frame having a bearing stud, a wheel provided with a bearing hub, ball bearings mounted adjacent opposite ends of the bearing hub, cooperating elements on the bearing stud engaging the ball bearings, and means for urging one of the elements toward the other, whereby contact is maintained between the elements and the ball bearings.

A preferred embodiment of this invention is illustrated in the accompanying drawing, in which Fig. 1 is a sectional view of an assembled side frame and wheel, Fig. 2 is a perspective view of a spring washer, Fig. 3 is a plan view of a modified form of spring washer, and Fig. 4 is an elevational view of the washer shown in Fig. 3.

Referring now to the drawing in detail, in which like numerals refer to like parts throughout, A lawn mower side frame 1 is provided with a boss 2 having a tapped opening 3, in which is secured a bearing stud 4 by means of threads 5 formed on the stud 4. Preferably, the stud 4 is rigidly and fixedly secured in the boss 2, after being threaded into place, by having the end of the threaded portion headed into a countersunk portion 6 of the opening 3. The stud 4 is formed with an enlarged portion 7 terminating in inner and outer shoulders 8 and 9 respectively, and an outer end portion 10, this outer end portion 10 being tapped to receive a screw 11. A tapered collar 12, known to the art as a "cone," is rigidly and fixedly secured on the stud 7 between the shoulder 8 and an outer face 13 of the boss 2. Contact of the cone 12 against the face 13 of the boss 2 adds materially to the rigidity of the stud 4, and aids in maintaining the axis of the stud 4 at right angles to the face of the frame 1.

A lawn mower wheel 14, provided with a rim 15 for receiving a tire 16, and the usual ring gear 17 for driving a reel pinion and reel (not shown), is formed with a central hub 18. The hub 18 is provided with an axial bore 19 terminating at each end thereof in enlarged recesses 20 and 21 for receiving ball bearing cups 22 and 23. The ball cups 22 and 23 are fixedly secured in the recesses 20 and 21 by means of a press or force fit. Ball and retainer sets 24 and 25 are revolvably and removably supported in the ball cups 22 and 23, in the usual manner.

A tapered collar or cone 26 is slidably supported on the end portion 10 of the stud 4, and, when in contact with the balls 25, the cone 26 is spaced outwardly from the shoulder 9 of the stud 4. The end 10′ of the stud 4 projects slightly beyond the outer face 27 of the hub 18, and a washer member 28, removably secured on the end 10′ of the stud 4, by means of the screw 11, covers the recess 21 without contacting the hub 18 of the wheel 14.

A spring washer 29, slidably supported on the end 10 of the stud 4, and located between the washer 28 and cone 26, exerts a thrust against the cone 26 which maintains the cone 26 in true operating contact with the balls 25 and, through this contact, the thrust exerted by the washer is transmitted through the hub 18 to maintain true operating contact of the balls 24 with the fixed cone 12. Thus, any wear which may occur in balls or cones is automatically taken up by the washer 29 and cone 26. The spaced relationship of the cone 26 and shoulder 9 on the stud 4 provides for axial movement of the cone 26 to take up wear.

The bearings are packed in grease at the factory. However, if it should be desirable or necessary to renew the lubrication, it is a simple matter to remove the screw 11, washers 28 and 29, and cone 26, then draw the wheel 14 off the stud 4, clean and relubricate the ball bearings, and replace the parts in reverse order.

Whereas the spring washer 29 has been shown in Figs. 1 and 2 as being dish shaped, a modified form of washer, as illustrated in Figs. 3 and 4 has also proved satisfactory in operation. A plain or standard round washer 30 is crimped or bent at 31 to provide a diametral ridge. In use, the ridge 31 may contact the cone 26, and the portions 32 of the rim of the washer at right angles thereto may contact the washer 28, or vice versa.

Preferably, the cones 12 and 26 are manufactured of steel, and hardened to a degree equal, or nearly equal, to the hardness of the balls 24 and 25. Thus, as the only contact between the wheel 14 and its supporting stud 4 is through the cones 12 and 26 and balls 24 and 25, the material of the wheel 14 may be of relatively soft material, such as cast or die-molded aluminum or plastic, without adversely affecting the durable wearing quality of the bearing.

As the washer 28 has no contact with the wheel 14, and the washer 29 and cone 26 are, in operation, practically stationary, there is no tendency for the washer or other related parts to unscrew the screw 11 during reverse motion of the wheel 14, as when the lawn mower may be pulled toward the operator.

Whereas a preferred form of this invention has been disclosed in the drawing and herein described, it will be readily understood by those skilled in the art that modifications may be made in the disclosed construction without departing from the scope of the invention. The stud 4 may be secured in the frame 1 by means of a force fit in a smooth bore, or the stud 4 and cone 24 may be formed as an integral part of the frame 1. The bearing herein described is equally adaptable to a wheel having a rubber or other tire as shown, or to a wheel provided with an integral cast traction rim.

Having thus described this invention, what I claim is:

In a lawn mower wheel construction, a supporting frame, a wheel stud on said frame, said stud being provided with an annular shoulder, a bearing cone rigidly secured on said stud and clamped between said shoulder an said frame, a wheel provided with a bearing hub, a pair of ball bearings supported in said hub in spaced relation, one of said bearings having a running engagement on said cone, a second cone slidably supported on said stud in running engagement with the other of said bearings, a closure cap removably secured on the end of said stud, and a compression spring washer on said stud and constricted between said cap and said second cone, whereby said spring exerts an axial thrust against said second cone in a direction toward said first cone and said frame.

F. WARREN WELLS.

REFERENCES CITED

The following references are of record in the file of this patent:

UNITED STATES PATENTS

| Number | Name | Date |
|---|---|---|
| 894,367 | Case | July 28, 1908 |
| 918,600 | Schacht | Apr. 20, 1909 |
| 1,298,980 | Lontz | Apr. 1, 1919 |